US005626696A

United States Patent [19]
Boni et al.

[11] Patent Number: 5,626,696
[45] Date of Patent: May 6, 1997

[54] DEVICE FOR RUNNING ON A FLAT TIRE FOR A MOTOR VEHICLE

[75] Inventors: Bernard Boni, Burty; Didier Riquier, Persan, both of France; Pascal Seradarian, Lawrenceville, N.J.

[73] Assignee: Hutchinson, Paris, France

[21] Appl. No.: 425,875

[22] Filed: Apr. 21, 1995

[30] Foreign Application Priority Data

Apr. 27, 1994 [FR] France ................................. 94 05101

[51] Int. Cl.$^6$ .................................................. B60C 17/04
[52] U.S. Cl. ...................................................... 152/520
[58] Field of Search ........................... 152/157, 158, 152/516, 520

[56] References Cited

U.S. PATENT DOCUMENTS 4,130,154 12/1978 Hampshire .................. 152/158
4,157,726 6/1979 Brewer ...................... 152/158 X
4,270,592 6/1981 Patchell ........................ 152/158

FOREIGN PATENT DOCUMENTS

| 100013 | 2/1984 | European Pat. Off. . |
| 4008513 | 9/1990 | Germany . |
| 2084088 | 4/1982 | United Kingdom . |

Primary Examiner—Michael W. Ball
Assistant Examiner—Francis J. Lorin
Attorney, Agent, or Firm—Bell, Seltzer, Park & Gibson

[57] ABSTRACT

A device for running on a flat tire, the device being formed by a split ring or by two half-rings that are connected together end to end and clamped onto the rim of a wheel, the half-rings being made of a polyamide that is reinforced with long glass fibers and it has a T-shaped section with an outer peripheral surface that forms a tread when running on a flat tire.

14 Claims, 5 Drawing Sheets

DEVICE FOR RUNNING ON A FLAT TIRE FOR A MOTOR VEHICLE

The invention relates to a device for running on a flat tire for a motor vehicle, in particular for a private car fitted with tubeless tires.

BACKGROUND OF THE INVENTION

Numerous devices are already known for running on a flat tire, some of which have been developed for fitting to armored vehicles or to vehicles for military purposes, and they are effective although complex in structure, heavy, and expensive, whereas other devices are much simpler but not very effective insofar as the distance that can be travelled on a flat tire is very short, with a tire being destroyed in a few kilometers if it continues to be run while flat.

OBJECTS AND SUMMARY OF THE INVENTION

An object of the invention is to provide a device for running on a flat tire that is very simple in structure, light in weight, and cheap, but that nevertheless is much more effective than are known devices, e.g. enabling a distance of more than 100 kilometers (km) or 150 km to be travelled on a flat tire at high speed and under normal driving conditions for a private car.

To this end, the invention provides a device for running on a flat tire for a motor vehicle having wheels fitted with tubeless tires, in particular a vehicle such as a private vehicle, the device comprising, for each wheel, a rigid ring mounted on the wheel rim, said ring being constituted by one or more circularly arcuate sectors whose ends are connected together end-to-end on the rim by linking and clamping means, wherein the, or each, sector includes a peripheral shoulder extending towards the outer side wall of the tire over a distance that is sufficient to constitute an abutment that impedes tearing off of the tire in the event of running on a tire that is flat or insufficiently inflated.

Because of the peripheral shoulder on the above-specified ring or sectors, the tire is prevented from coming off while running flat or underinflated, thus preventing the loss of vehicle mobility that would result from the tire coming off. In addition, by limiting displacement of the sidewall of the tire in an inwards direction, the device eliminates the wobbling sensation otherwise given by the moving vehicle that is analogous to the sensation of a vehicle travelling on a very slippery surface, e.g. on ice.

According to another characteristic of the invention, the, or each, sector is a solid or single-piece part made of reinforced thermoplastic resin having a coefficient of thermal expansion substantially equal to that of the rim, and whose base applied against the rim includes an annular foot whose shape corresponds to that of a well or drop center of the rim, such that clamping the ring on the rim also serves to lock it in place in an axial direction.

This gives rise to numerous advantages:

the device of the invention is very light and the total weight of all four devices fitted to the four wheels of a motor vehicle is much less than the weight of a spare wheel;

it can be mounted on a wheel simply and quickly without requiring special tooling; and it makes it possible to run on a flat tire for a distance of more than 100 km to 150 km at high speed and under driving conditions that are normal.

Indeed, it has been found that the device of the invention is so effective that the driver of the vehicle is generally unaware of running on a flat tire.

It is therefore advantageous to provide at least one element projecting from the outside surface of the ring, so that said element(s) provide warning that a tire is flat or underinflated on each revolution of the wheel.

In a variant, it is naturally possible to make use of other means, e.g. such as a pressure sensor mounted in the wheel and associated with an alarm or signalling circuit to warn the driver that tire inflation pressure has fallen below a predetermined limit value.

In a first embodiment of the invention, the device is constituted by a ring that is split at a point of its periphery and that has its facing ends connected together by clamping means, e.g. of the screw and nut or "turnbuckle" type.

In another embodiment of the invention, the device is made up of two sectors: or half-rings, each extending over an angle of 180°, which sectors are connected together end-to-end by clamping means, e.g. of the screw and nut or "turnbuckle" type.

Advantageously, the ring or each sector or half-ring is of varying section, with the thickness of the middle portion of its section being greater at the ends of the ring or the half-ring than it is towards the middle thereof.

Preferably, the ring or each sector or half-ring is made by molding polyamide reinforced with long glass fibers, the polyamide used preferably being that which is sold under the trademark NYRIM.

In a variant embodiment of the invention, the radially outer peripheral surface of the ring or of each sector or half-ring is covered in an overmolded layer of elastomer.

That makes it possible to damp possible shocks between the ring and the tire, whether the tire is inflated normally or deflated to a greater or lesser extent, thereby protecting the tire and extending its lifetime.

Finally, the inside surface of the tire includes, facing the outer peripheral surface of the ring, a layer of lubricant, e.g. in the form of a very viscous gel that has a very high melting point.

This layer of lubricant makes it possible to avoid the tire heating up and being destroyed as would otherwise happen due to the tangential speed difference between the inside surface of the tire and the outer peripheral surface of the ring.

BRIEF DESCRIPTION OF THE DRAWINGS

The invention will be better understood and other characteristics, details, and advantages thereof will appear more clearly on reading the following description given by way of example and made with reference to the accompanying drawings, in which.

MORE DETAILED DESCRIPTION

Figure 9:
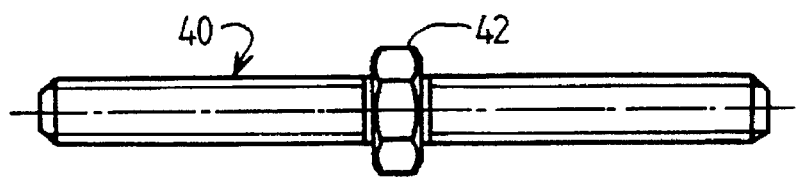
FIGS. 9, 10, and 11 show linking and clamping means for the sectors of a ring of the invention.
Figure 10:
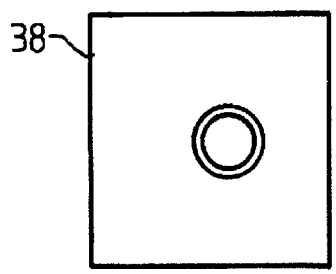
Figure 11:
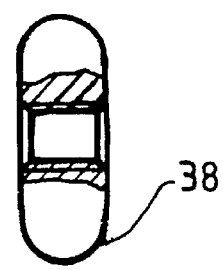

In FIGS. 1 to 5, various characteristics of a ring device of the invention are shown, which device comprises two identical portions 10 each in the form of a half-ring, which portions are designed to be connected together end to end by linking and clamping means shown in FIGS. 9 to 11.

Each half-ring 10 is a solid part of molded reinforced plastics material, preferably of a polyamide such as that sold under the trademark NYRIM (a "nylon" designed to be used in the R.I.M. method), and which is reinforced with long glass fibers.

As can be seen in FIGS. 2 to 5, each half-ring 10 has a generally T-shaped or L-shaped section in which the transverse limb 12 corresponds to the outer peripheral surface of the ring and constitutes a tread, the half-ring also having a base 14 opposite from the limb 12 and designed to be pressed against and clamped to a portion of the outer peripheral surface of the rim of a wheel, said base being integrally molded with a lateral foot 16 designed to engage in a rim well or drop center and being complementary in shape to that of the rim well or drop center, as described in detail below.

The portion 18 of each half-ring connecting the tread 12 to the base 14 and corresponding to the vertical limb of the T-shaped or L-shaped section is of thickness that varies along the half-ring, the thickness being at a minimum between the ends of the half-ring and being at a maximum at its ends where housings are formed therein for receiving the linking and clamping means.

These housings respectively comprise a blind cylindrical passage 20 formed in the portion 18 and extending perpendicularly to the corresponding end face 22 of the half-ring, opening out in said face.

Each of them also comprises a chamber 24 formed in the portion 18 of the half-ring and opening out in the same side face 26 thereof as carries the lateral foot 16.

Each chamber 24 maybe square or polygonal in section, for example, thereby preventing rotation of a nut of corresponding shape that it is intended to receive.

Figure 6:
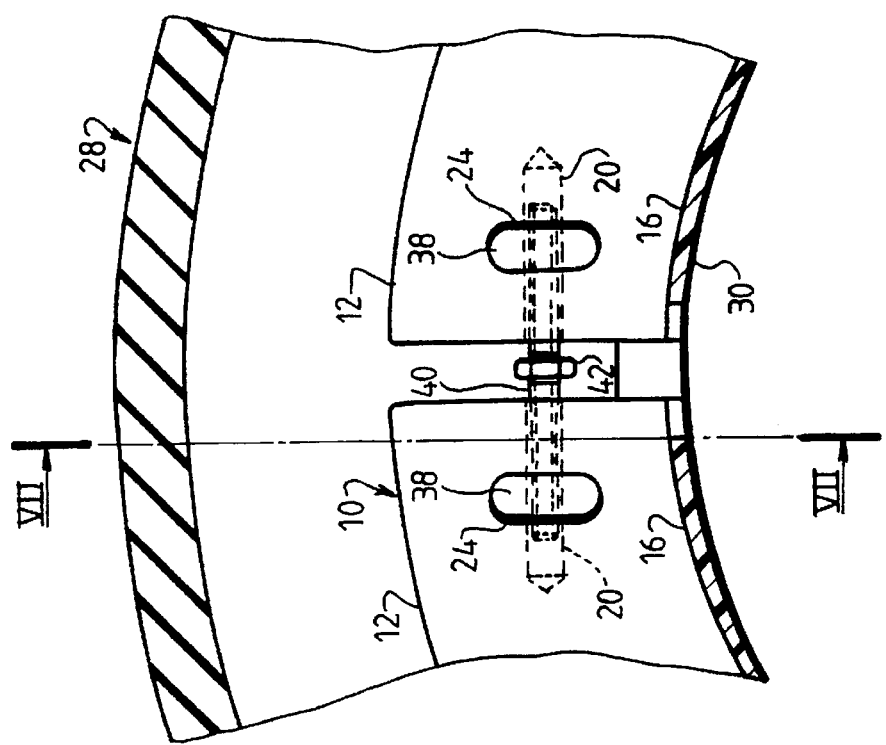
FIG. 6 is a fragmentary cross-section through a wheel including a device of the invention, the section being on line VI—VI of FIG. 7.

The device of the invention is assembled very simply, as now described with reference to FIGS. 6 and 7.

A tire 28 is engaged on the rim 30 of a wheel, said rim having two lateral flanges 32 forming abutment and retaining zones for the beads 34 of the tire, the tire initially being mounted on the rim so that one of its beads is to be found more or less in the middle of the rim while its other bead is outside it. It is then possible to insert the two half-rings 10 inside the tire and to put them into place around the rim, after which the facing ends of the two half-rings 10 need to be connected together and the ring needs to be clamped onto the peripheral outside surface of the rim.

Figure 1:
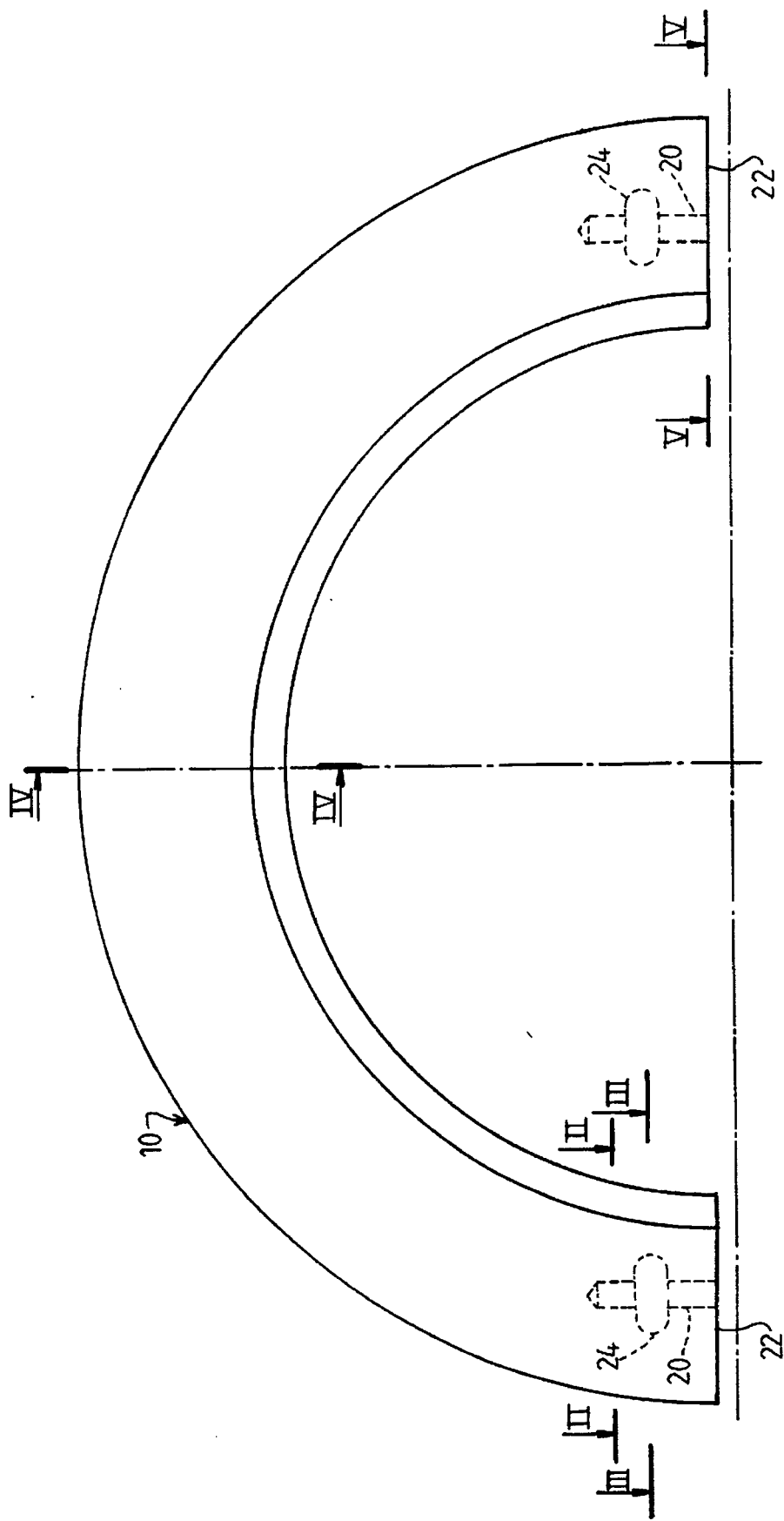
FIG. 1 is a diagrammatic elevation view of a sector of a ring of the invention.
Figure 2:
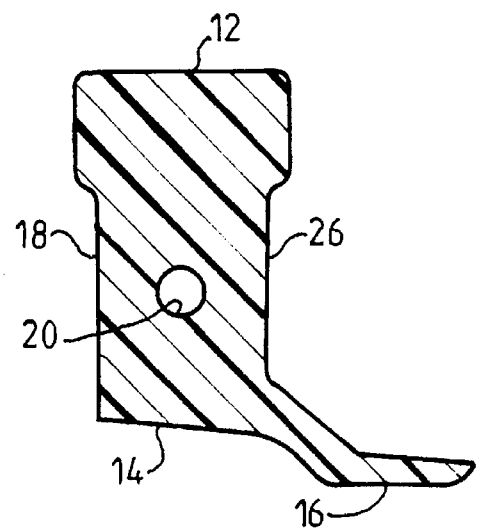
FIGS. 2 to 5 are section views through said ring sector on lines II—II, III—III, IV—IV, and V—V respectively of FIG. 1.
Figure 3:
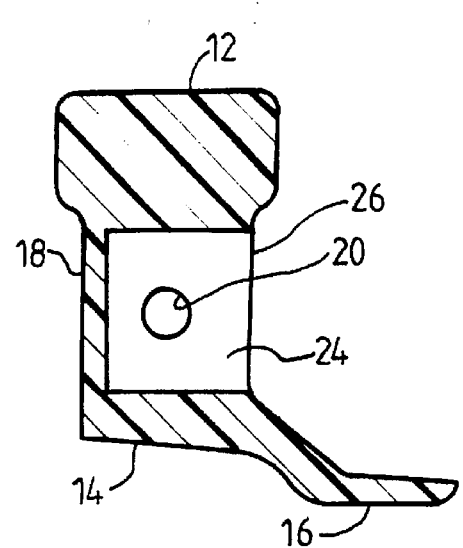
Figure 4:
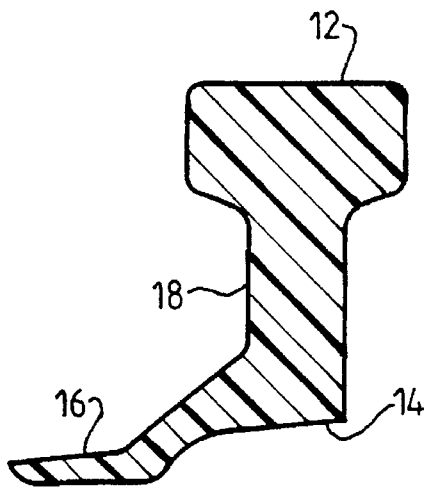
Figure 5:
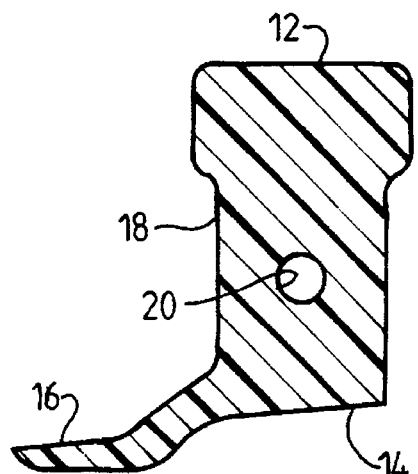
Figure 7:
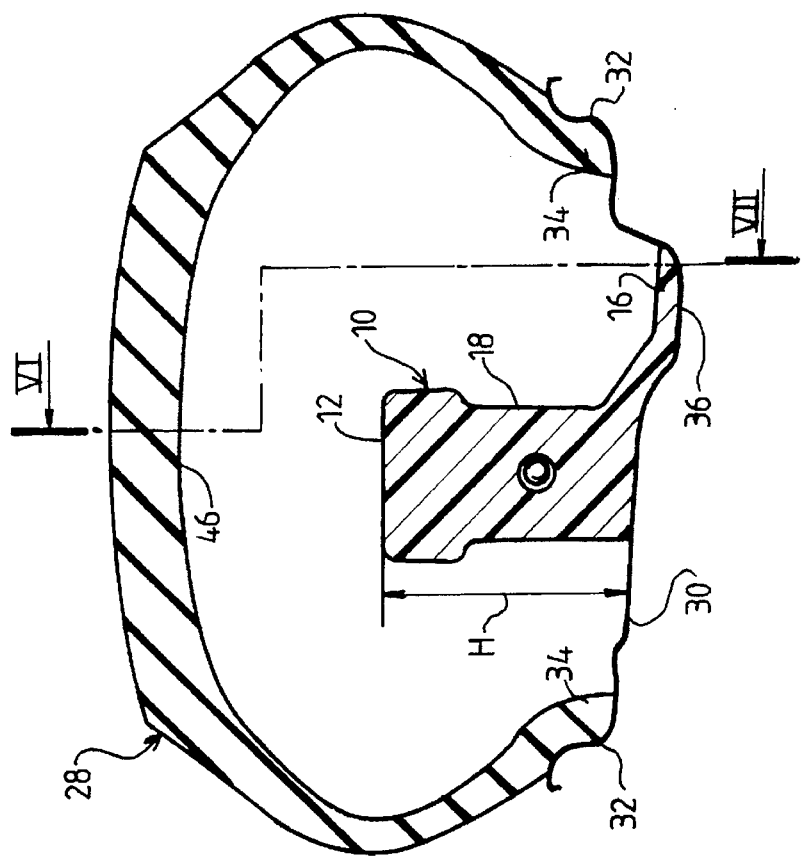
FIG. 7 is a fragmentary axial section of the wheel of FIG. 6, the section being on line VII—VII of FIG. 6.

For this purpose, when the two half-rings 10 are properly placed around the rim, the lateral feet 16 are placed in the rim well or drop center in which they are to be received as shown in FIG. 7, the nuts 38 shown in FIGS. 10 and 11 are placed in the chambers 24 (unless that has already been done) and a threaded rod 40 is inserted into the cylindrical passages 20 which are in facing alignment, the rod 40 shown in FIG. 9 having a righthand or normal thread along half its length and having a lefthand or reverse thread along the other half of its length, and including means 42 in its middle to enable it to be rotated, e.g. means having the shape of a hexagonal nut. The screw and nut means thus acting as a turnbuckle.

In a manner well known the art, rotating the threaded rod 40 about its axis in one direction causes the facing ends of the two half-rings 10 to be moved towards each other by the screw engagement of the rod in the nuts 38, thereby enabling the ring to be clamped on the periphery of the rim 30 and preventing it from rotating about the axis of the wheel. The engagement of the lateral foot 16 of the ring in the rim well or drop center 36 serves to prevent the ring from moving parallel to the axis of the wheel.

The half-rings 10 are made of a material selected to have a coefficient of thermal expansion that is substantially equal to that of the rim 30 (which is often made of aluminum). Thus, any temperature variations that may occur within the device of the invention and the rim 30 will give rise to substantially equal amounts of thermal expansion or contraction, thus avoiding any influence on the clamping of the device and the way it is prevented from rotating on the rim 30.

The dimensions of the half-rings 10 are designed so that the side walls 28 of the tire do not come in contact or into load-supporting engagement with the ground in the event of running on a flat tire. For this purpose, the height H of each half-ring, i.e. the radial dimension between the tread 12 and the base 14 which is applied to the rim, is not less than 45% of the nominal inside height of the tire, and is preferably equal to 50% of said nominal inside height.

The width of the tread 12 on the ring is, for example, about 45 mm, whereas the width of the portion 18 may vary from 20 mm or 25 mm to about 35 mm along the length of each half-ring.

The total weight of the device as described above may be 2 kg for a downmarket vehicle and 4 kg for an upmarket vehicle, giving a range of about 8 kg to 16 kg for all four wheels of a motor vehicle, depending on the kind of vehicle.

Figure 8:
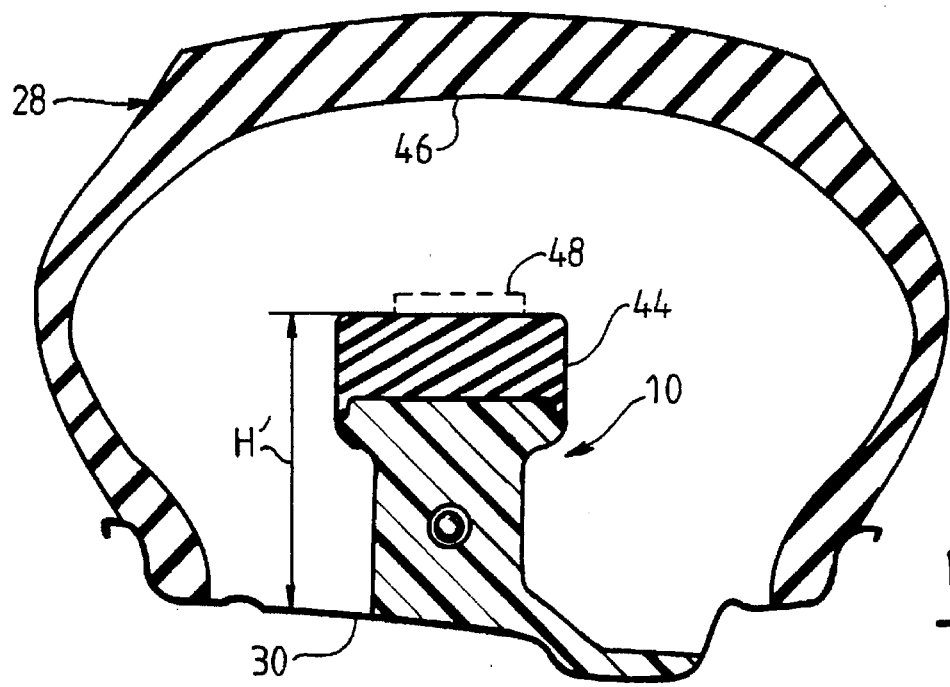
FIG. 8 is a view corresponding to FIG. 6, but showing a variant embodiment of the invention.

According to another characteristic of the invention, as shown in FIG. 8, the tread of each half-ring 10 is constituted by a layer 44 of elastomer overmolded onto the radially outer peripheral surface of the half-ring, the elastomer being polyisoprene, for example, having hardness: of about 70 on the Shore A scale. This layer of elastomer 44 is designed to damp shock between the tire 28 and the half-ring 10, and thus to reduce the risk of damaging the tire. The height H' of each half-ring 10 (or the radial distance between the tread and the base of the half-ring) is then preferably equal to 52% of the nominal internal height of the tire.

In a variant embodiment, the ring of the device of the invention is made as a single part which is split at one point in is periphery, the linking and clamping means, e.g. of the screw and nut type, being provided at the facing ends of said part. Under such circumstances, the ring is mounted on the rim of the wheel by elastic deformation, which is easier and quicker than in the preceding embodiment, and the cost is smaller.

According to yet another characteristics of the invention, the inside surface 46 of the tire which may come into contact with the thread 12, 44 of the ring is coated with a layer of lubricant such as a very viscous gel having a high melting point, which gel may be constituted, for example, by a polypropylene-glycol sold by TOTAL, or any other equivalent substance. This layer of lubricant makes it possible, when running on a flat tire, for the inside surface of the tire to slip over the tread of the device of the invention given that they have a difference in length or perimeter, thereby avoiding intense friction against the inside surface of the tire which would cause the tire to be destroyed quite quickly.

As already mentioned, a device of the invention makes it possible to travel on a flat tire over a considerable distance (greater than 100 km to 150 km) at high speed and without the driver of the vehicle being aware of the fact that a tire is flat. It is therefore desirable to warn the driver and for this purpose it is simple to fix a small projecting strip 48 on the outside face of the thread 12 or 44 of the device of the invention, e.g. as shown diagrammatically in FIG. 8, so that the strip 48 generates noise and vibration when it comes into contact with the ground on each revolution of the wheel when running on a flat tire. To prevent the noise and the vibration annoying the driver, it is possible to fix the strip 48 on the outside surface of the tread of the device by using an adhesive which is functional when cold but weak when hot so that the adhesive melts and enables the strip 48 to be released after driving for a few kilometers on a flat tire.

Naturally, in order to improve wheel balancing, two diametrically-opposite strips 48 may be provided on each device of the invention.

The strip or strips 48 also serve to warn the driver when a tire is underinflated, which could give rise to the tire bursting or to it being torn off the wheel rim.

Figure 12:
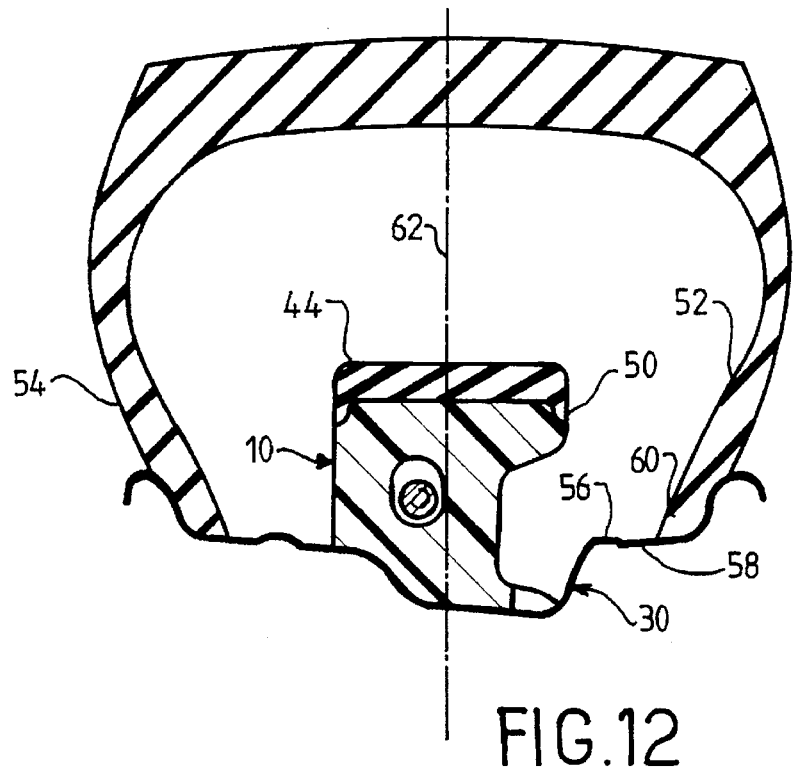
FIG. 12 is a fragmentary diagrammatic view in axial section of a wheel fitted with a device of the invention and it shows another characteristic of the device.

According to yet another characteristic of the invention, as shown in FIG. 12, the sector or half-ring 10 includes an outer peripheral shoulder 50 directed towards the outer sidewall 52 of the tire 28 (i.e. the sidewall that is on the outside of the vehicle, whereas the opposite sidewall 54 looks towards the inside of the vehicle), said shoulder projecting towards the sidewall 52 in a direction parallel to the axis of the wheel and extending substantially as far as a projection 56 formed on the rim 30 at the end of the seat 58 which receives the outside bead 60 of the tire.

The sector or half-ring 10 of FIG. 12 is asymmetrical about the middle transverse plane 62 of the rim, and it is substantially L-shaped in section.

The peripheral shoulder 50 covered in the elastomer layer 44 forms an abutment that limits displacements of the tire side wall 52 in an inwards direction, and which prevents the tire being torn off the rim (bead 60 sliding off the seat 58), which would prevent the vehicle being drivable in the event of running on a tire that is flat or underinflated.

This limit on inwards displacement of the side wall 52 of the tire also eliminates any sensation of the vehicle travelling on a slippery surface, such as ice, for example, which would otherwise be felt when running on a flat tire if such a limit were not applied.

The other side of the sector or half-ring 10 can be flat without any peripheral shoulder, as shown in FIG. 12, insofar as experience has shown that a tire always begins to be torn off on the outside and never on the inside.

Figure 13:
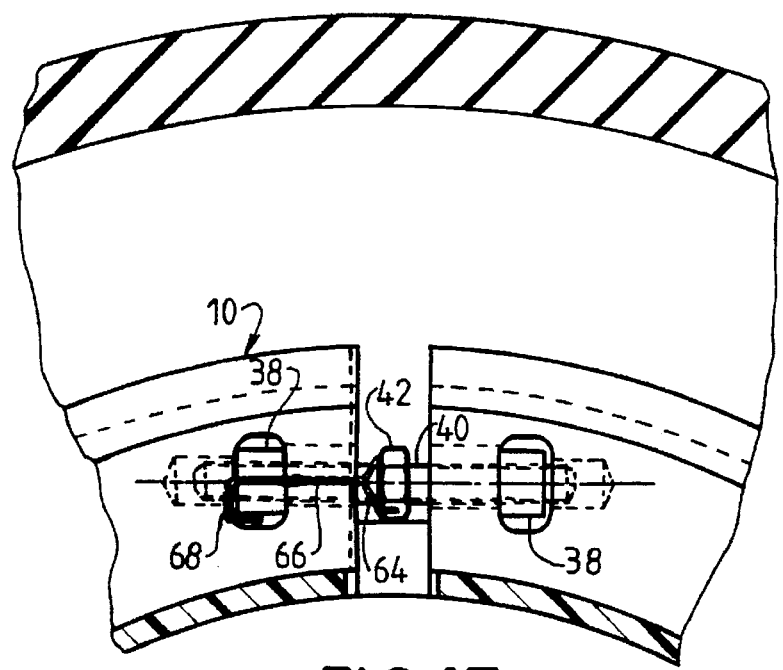
FIG. 13 is a fragmentary diagrammatic view in cross-section through the wheel of FIG. 12.

FIG. 13 shows means for locking the screw and nut assembly as used to unite the facing ends of the ring or two sectors or half-rings 10. FIG. 13 shows the nuts 38, the threaded rod 40, and the drive nut 42 as shown in FIG. 6, together with locking means designed to prevent the rod 40 rotating in the nuts 38 after it has been tightened therein, which locking means comprise a steel wire 64 which passes through a channel made in the drive nut 42 to form a loop whose two strands are twisted together as shown at 66, one of the strands then being passed through a hole in the nut 38 while the other strand passes outside said nut, the two ends of the strands then being twisted together as shown at 68.

This nut-locking system is simple and effective.

In general, the device of the invention has the advantage of being easy to manufacture, simple in structure, and not very expensive, and also of being capable of being mounted quickly on the rim of a wheel without using special tools.

We claim:

1. A device for running on a flat tire for a motor vehicle with wheels having rims fitted with tubeless tires, the device comprising, for each wheel, a rigid ring mounted on the wheel rim, said ring being constituted by at least one circularly arcuate sector having ends which are connected together end-to-end on the rim by linking and clamping means, wherein said at least one sector is a solid or single-piece part made of reinforced thermoplastic resin having a coefficient of thermal expansion substantially equal to that of the rim.

2. A device according to claim 1, wherein the, or each, sector is asymmetrical in shape about a middle transverse plane of the rim and has a section that is substantially L-shaped.

3. A device according to claim 1, wherein said at least one sector includes a peripheral shoulder extending towards the outer side wall of the tire over a distance that is sufficient to constitute an abutment that impedes tearing off of the tire in the event of running on a tire that is flat or insufficiently inflated, and whose base applied against the rim includes an annular foot whose shape corresponds to that of a well or drop center of the rim, such that clamping on the ring on the rim also serves to lock it in place in an axial direction.

4. A device according to claim 1, wherein it is essentially constituted by a ring that is split at one point on its periphery.

5. A device according to claim 1, wherein it is constituted by two half-rings each extending over an angle of 180°, which half-rings are connected together end to end by screw and nut type clamping means associated with nut locking means.

6. A device according to claim 1, wherein each sector or half-ring has a chamber at each end for receiving a nut and for preventing it from rotating, together with a passage for receiving a threaded rod opening out through an end face of the half-ring and passing through the above-specified chamber.

7. A device according to claim 1, wherein each sector is of varying section, the thickness of the middle portion of its section being greater at the ends of the sector or of the half-ring.

8. A device according to claim 1, wherein each sector is made by molding polyamide reinforced with long glass fibers.

9. A device according to claim 1, wherein the height of each sector is equal to not less than 45%, and for example 50% of the nominal inside height of the tire.

10. A device according to claim 1, wherein the radially outer peripheral surface of each sector includes an overmolded layer of elastomer.

11. A device according to claim 10, wherein the height of each sector is equal to about 52% of the nominal inside height of the tire.

12. A device according to claim 10, wherein the elastomer is a polyisoprene whose hardness is about 70 on the Shore A scale.

13. A device according to claim 1, wherein the outer peripheral surface of the ring includes at least one outwardly projecting element.

14. A device according to claim 1, wherein the inside surface of each tire includes, facing the outer peripheral surface of the ring, a layer of lubricant.

* * * * *